(12) United States Patent
    Cegla et al.

(10) Patent No.: US 10,983,096 B2
(45) Date of Patent: Apr. 20, 2021

(54) GUIDED WAVE TESTING

(71) Applicant: IP2IPO Innovations Limited, London (GB)

(72) Inventors: Frederic Bert Cegla, London (GB); Balint Herdovics, London (GB)

(73) Assignee: IP2IPO Innovations Limited, London (GB)

( * ) Notice: Subject to any disclaimer, the term of this patent is extended or adjusted under 35 U.S.C. 154(b) by 171 days.

(21) Appl. No.: 16/085,101

(22) PCT Filed: Feb. 22, 2017

(86) PCT No.: PCT/GB2017/050453
§ 371 (c)(1),
(2) Date: Sep. 14, 2018

(87) PCT Pub. No.: WO2017/158318
PCT Pub. Date: Sep. 21, 2017

(65) Prior Publication Data
US 2019/0079056 A1  Mar. 14, 2019

(30) Foreign Application Priority Data
Mar. 16, 2016  (GB) ..................................... 1604440

(51) Int. Cl.
*G01N 29/04* (2006.01)
*G01N 29/22* (2006.01)
(Continued)

(52) U.S. Cl.
CPC ......... *G01N 29/043* (2013.01); *G01N 29/221* (2013.01); *G01N 29/2412* (2013.01);
(Continued)

(58) Field of Classification Search
CPC ............... G01N 29/043; G01N 29/221; G01N 29/2412; G01N 29/32
(Continued)

(56) References Cited

U.S. PATENT DOCUMENTS 4,127,035 A    11/1978  Vasile
5,895,856 A    4/1999  Johnson et al.
(Continued)

FOREIGN PATENT DOCUMENTS

CA    2 209 899    11/1996
EP    2 196 800    6/2010
(Continued)

OTHER PUBLICATIONS

International Search Report and Written Opinion of the ISA for PCT/GB2017/050453, dated May 17, 2017, 12 pages.
(Continued)

*Primary Examiner* — Tarun Sinha
(74) *Attorney, Agent, or Firm* — Nixon & Vanderhye P.C.

(57) ABSTRACT

An apparatus for guided wave testing of a test object comprises a linear array of receiver electromagnetic acoustic transducers (EMATs), and at least one linear array of transmitter EMATs disposed substantially parallel to the linear array of receiver EMATs and configured to launch guided waves in said test object in a direction substantially perpendicular to the at least one linear array of transmitter EMATs. Either (i) transmitter coils of the at least one linear array of transmitter EMATs have a common winding direction, receiver coils of adjacent receiver EMATs have alternating winding directions, and receiver coils of at least two adjacent receiver EMATs are connected in series, or (ii) transmitter coils of the transmitter EMATs have alternating winding directions, receiver coils of adjacent receiver EMATs have a common winding direction, and receiver
(Continued)

coils of at least two adjacent receiver EMATs are connected in series.

20 Claims, 12 Drawing Sheets

(51) Int. Cl.
*G01N 29/24* (2006.01)
*G01N 29/32* (2006.01)

(52) U.S. Cl.
CPC ....... *G01N 29/32* (2013.01); *G01N 2291/023* (2013.01); *G01N 2291/048* (2013.01); *G01N 2291/0425* (2013.01); *G01N 2291/0426* (2013.01); *G01N 2291/106* (2013.01); *G01N 2291/262* (2013.01); *G01N 2291/2634* (2013.01)

(58) Field of Classification Search
USPC .......................................... 73/622
See application file for complete search history.

(56) References Cited

U.S. PATENT DOCUMENTS

| | | |
|---|---|---|
| 6,624,628 B1 | 9/2003 | Kim et al. |
| 2003/0159516 A1 | 8/2003 | Hubschen |
| 2006/0027022 A1* | 2/2006 | Flora .................... G01N 29/041 73/627 |
| 2009/0084185 A1* | 4/2009 | Reiderman ............... B06B 1/04 73/643 |
| 2009/0139337 A1 | 6/2009 | Owens et al. |
| 2012/0103097 A1 | 5/2012 | Lopez Jauregui |

FOREIGN PATENT DOCUMENTS

| | | |
|---|---|---|
| JP | 62-277555 | 12/1987 |
| JP | 2006-53134 | 2/2006 |
| JP | 2008-76296 | 4/2008 |
| JP | 2013-88118 | 5/2013 |
| JP | 2013-210200 | 10/2013 |
| JP | 2014-102157 | 6/2014 |
| JP | 2015-40746 | 3/2015 |
| WO | 2006/014714 | 2/2006 |
| WO | 2014/190268 | 11/2014 |

OTHER PUBLICATIONS

Combined Search and Examination Report for GB160440.6, dated Sep. 2, 2016, 5 pages.
Alleyne, et al., Rapid Long range Inspection of Chemical Plant Pipework Using Guided Waves, Key Engineering Materials, 1999, vols. 270-273, pp. 434-441, Web Url: httpl/Vv'\Vvv.ndtnet/articl e/\vcndtOO/papers/idn 166/idn 166.htm.
Wang, Y., et al., Enhancement of the Excitation Efficiency of a Torsional Wave PPM EMAT Array for Pipe Inspection by Optimizing the Element Number of the Array Based on 3-D FEM. *Sensors*, Feb. 3, 2015, vol. 15, 3471-349.
First Office Action for CN Application No. 2017900006541 dated Apr. 23, 2019 and English translation, 4 pages.
Office Action for JP Application No. 2018-547322 dated Mar. 2, 2021, 4 pages.
A. Furusawa et al, "Ultrasonic Guided Wave Testing System using Electromagnetic Acoustic Transducers and the Application in Steel Pipes with Inner Corrosion" Journal of the Japan Society of Applied Electromagnetics and Mechanics, Feb. 2015, vol. 23, Issue 2, pp. 350-355.

\* cited by examiner

GUIDED WAVE TESTING

This application is the U.S. national phase of International Application No. PCT/GB2017/050453 filed 22 Feb. 2017, which designated the U.S. and claims priority to GB Patent Application No. 1604440.6 filed 16 Mar. 2016, the entire contents of each of which are hereby incorporated by reference.

This disclosure relates to guide wave testing, such as, for example, guided wave testing of pipes.

It is known to perform guided wave testing using the lowest order torsional guided wave mode T(0,1). Such techniques may use piezo-electric and magneto-strictive transducers. Both transduction mechanisms have a high sensitivity and result in strong signals. However, both of these transduction modalities also have the problem of using actuators (a magneto-strictive strip (see, for example, U.S. Pat. No. 6,624,628) or a piezo-electric element) that need to be mechanically coupled to the structure either by force or by structural bonding. Any changes in the adhesive bond or force on the transducer result in a change in excited signal strength. This can cause problems when trying to detect small changes in signals that are monitored as a function of time. The appearance of these small changes can either be a result of the presence of small defects that should be detected, but they are also easily confused with changes in transduction sensitivity due to changes in the adhesive bond or force that couples the transducer to the pipe or other test object (e.g. a weld on an oil platform leg, a section of a large vessel, etc), which can easily results from changes in environmental conditions such as temperature.

Electromagnetic acoustic transducers (EMATs) reduce this problem because they rely on a non-contact electromagnetic coupling mechanism between the transducer and the pipe (see Wang, Wu, Sun, & Li, 2015). This has the added advantage of penetrating through thick coatings, such as protective paints on pipes. However, EMATs have poor transduction sensitivity and are therefore rarely used.

U.S. Pat. No. 5,895,856 describes the use of EMATs for torsional guided wave excitation, however these require high power signals to be provided to them in order produce usable signals and/or high gain amplifiers to receive the weak signals that the transducer excites. High power EMATs cannot be employed in hazardous environments where intrinsic safety concerns restrict the maximum voltage and current that can be used. Furthermore, the high amplifier gains that are required to receive the weak signals require longer waiting times between sending and receiving on the EMAT transducer(s) because of electro-magnetic cross talk between coils and the settling times of receive amplifiers after switching. This either requires a large physical separation of the sending and receiving transducer, so that any cross talk is sufficiently reduced, or it requires large wait times between sending out a transmitted signal and switching back to receive the received signal on a close by receiving transducer. Both of these conventional implementations are undesirable because they either result in a large transducer or a large blind spot near the transducer from which no signal can be received.

At least some embodiments of the disclosure provide apparatus for guided wave testing a test object comprising:
a linear array of receiver electromagnetic acoustic transducers, each of said receiver electromagnetic acoustic transducers having a receiver coil and serving to convert vibrations in said test object into received electrical signals in said receiver coil; and
at least one linear array of transmitter electromagnetic acoustic transducers disposed substantially parallel to said linear array of receiver electromagnetic acoustic transducers and configured to launch guided waves in said test object in a direction substantially perpendicular to said at least one linear array of transmitter electromagnetic acoustic transducers, each of said transmitter electromagnetic acoustic transducers having a transmitter coil and serving to convert driving electrical signals in said transmitter coil into vibrations in said test object; wherein one of:
  (i) transmitter coils of electromagnetic acoustic transducers within said at least one linear array of transmitter electromagnetic acoustic transducers have a common winding direction, receiver coils of adjacent electromagnetic acoustic transducers within said linear array of receiver electromagnetic acoustic transducers have alternating winding directions, and receiver coils of at least two adjacent electromagnetic acoustic transducers within said linear array of receiver electromagnetic acoustic transducers are connected in series; and
  (ii) transmitter coils of electromagnetic acoustic transducers within said at least one linear array of transmitter electromagnetic acoustic transducers have alternating winding directions, receiver coils of adjacent electromagnetic acoustic transducers within said linear array of receiver electromagnetic acoustic transducers have a common winding direction and receiver coils of at least two adjacent electromagnetic acoustic transducers within said linear array of receiver electromagnetic acoustic transducers are connected in series.

At least some embodiments of the disclosure provide a method of guided wave testing a test object comprising:
coupling a linear array of receiver electromagnetic acoustic transducers to said test object, each of said receiver electromagnetic acoustic transducers having a receiver coil;
coupling at least one linear array of transmitter electromagnetic acoustic transducers to said test object, each of said transmitter electromagnetic acoustic transducers having a transmitter coil;
converting driving electrical signals in said transmitter coil into transmitted vibrations in said test object; and
converting received vibrations in said test object into received electrical signals in said receiver coil; wherein one of:
  (i) transmitter coils of electromagnetic acoustic transducers within said at least one linear array of transmitter electromagnetic acoustic transducers have a common winding direction, receiver coils of adjacent electromagnetic acoustic transducers within said linear array of receiver electromagnetic acoustic transducers have alternating winding directions, and receiver coils of at least two adjacent electromagnetic acoustic transducers within said linear array of receiver electromagnetic acoustic transducers are connected in series; and
  (ii) transmitter coils of electromagnetic acoustic transducers within said at least one linear array of transmitter electromagnetic acoustic transducers have alternating winding directions, receiver coils of adjacent electromagnetic acoustic transducers within said linear array of receiver electromagnetic acoustic transducers have a common winding direction and receiver coils of at least two adjacent electromagnetic acoustic transducers within said linear array of receiver electromagnetic acoustic transducers are connected in series.

Example embodiments will now be described, by way of example only with reference to the accompanying drawings in which:

FIG. 1 schematically illustrates the principle of eddy current generation;

FIG. 2 schematically illustrates phase velocity dispersion curves for a steel pipe;

FIG. 3 schematically illustrates an arrangement of pipe, coils and magnets for a Lorentz force EMAT and a cross section showing the current flow direction in the coil and magnet polarity as well as the resulting surface tractions to excite torsional waves; discreet patches of surface tractions will be excited, the ideal excitation would be a continuous surface traction over the whole circumference of the pipe;

FIG. 4 schematically illustrates a pipe and transducer rings;

FIG. 5 schematically illustrates non-dispersive waves travelling in the right direction (x<0) and the cancelled waves in the left direction (x>p);

FIG. 6 schematically illustrates calculated left and right travelling waves;

FIG. 7 schematically illustrates streamlines of current flow caused by an induced voltage;

FIG. 8 schematically illustrates capacitive coupling between transmitters (Tx1, Tx2) and a receiver (RX1);

FIG. 9 schematically illustrates induced current in two symmetrically (with respect to the x-z plane) arranged receiver (Rx) coils due to a magnetic flux that results from a current in a transmitter (Tx) coil: all coils are planar and located on the x-y plane;

FIG. 10 schematically illustrates how wiring together of symmetrically located Rx receiver coils can cancel out the electromagnetic breakthrough signal from the transmitter;

FIG. 11 schematically illustrates a torsional guided wave EMAT transducer system, showing (at the front) two transmitting transducer EMAT transmitter coil rows (linear arrays) separated by ¾ λ and (at the back) a row (linear array) of receiver EMAT receiver coils that is circumferentially shifted so that a breakthrough signal can be cancelled out;

FIG. 12 schematically illustrates differences in circumferential position of Tx and Rx coils and different wiring pattern of the Tx and Rx coils (an unwrapped PCB is shown) as well as a different magnet orientation pattern around the circumference for the Tx and Rx coils;

FIG. 13 schematically illustrates a post-processed right and left travelling waves;

In accordance with the present disclosure the sending and receiving transducer can send and receive guided waves from locations with low axial separation along a pipe (which may or may not carry a fluid). Furthermore, the transducers can be arranged in such a way that the direction in which torsional guided waves are sent can be selected.

This description starts by describing the Lorentz force mechanism of exciting mechanical tractions on a conductive surface in the presence of a bias magnetic field and an induced eddy current. It then describes guided wave propagation in pipes and tubes. Then it is described how the use of two transducer rings (linear arrays of transmitter EMATs) at (2n+1)/4λ axial separation can be used to carry out directional sending. Using a simple model that estimates the signal transmission losses in excitation and reception, the signal amplitude at the receiver is predicted. Because of the low signal amplitude a high gain amplifier is required on reception. The high gain amplification causes many problems. Capacitive and electro-magnetic coupling at the receiver coils (part of linear array of receiver EMATs) due to the transmitting coils results in a large breakthrough signal. Under normal conditions, and with close separation of the transmitter and receiver the breakthrough signal would saturate the receiving amplifier and prevent reception of the signal for a long time. It is then described how by appropriate design of the transmitter and receiver coils (and the use of different wiring patterns and magnet orientations within the Tx and Rx array), the breakthrough signal can be reduced/eliminated and signals can be received when they are sent with a transmitter that is closely located to a receiver. The resulting signals of the new combination of receiver and transmitter GW EMAT rings are then described.

The Lorentz Force Mechanism for Exciting Surface Tractions

Figure 1:
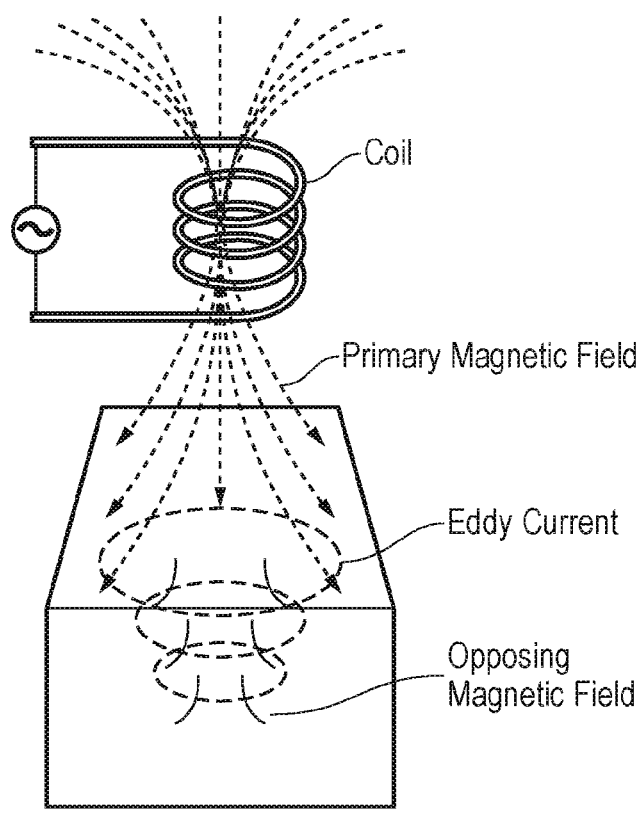

The EMAT's working principle is based on electromagnetic physical principles and is described by Maxwell's equations. The EMAT consists of two main elements, the permanent magnet (although electromagnets can also be used) disposed to generate a magnetic field with a direction substantially orthogonal to the surface of the underlying body (e.g. pipe), and a driving coil (transmitter coil and/or receiver coil). More generally a magnetic pole is disposed over the coil to generate a magnetic field, e.g. the two poles of a horseshoe magnet could provide magnetic field to two separate portions of the same or different coils. The excitation mechanism is as follows: the alternating current flowing in the coil generates a changing magnetic field, which induces closed loop eddy currents in the steel media. The eddy current flows in the metal conductor parallel to the coil. The Lorentz force that excites the ultrasonic waves is generated from the interaction of the static magnetic field of the permanent magnet, and the eddy current that was induced in the sample. The eddy current generation principle is shown in FIG. 1. The magnetic flux is described by Ampere's circuital law. The closed loop integral of the magnetic field is proportional to the current passing through the surface. B denotes to the magnetic flux density. J stands for the current density.

$$\oint_C B \cdot dl = \mu_0 \iint_S J \cdot dS \qquad \text{Equation 1}$$

As the magnetic field changes it generates the electrical field E, which is described by Faraday's law of induction. The change of the magnetic field passing through a surface equals to the integral of the electric field along the closed loop around the same surface. The direction of the Electric field and its magnetic field are opposing the original magnetic flux. If the Electric field is in a conductive material, eddy currents will flow in the conductor. The magnitude of the induced current is described by Ohm's differential law.

$$\oint_C E \cdot dl = -\frac{d}{dl} \int \int_S B \cdot dS \qquad \text{Equation 2}$$

$$J = \sigma E \qquad \text{Equation 3}$$

The generated eddy current reacts with the static magnetic field, which generates the body force f. The direction of the force is calculated using the right hand rule. $B_0$ refers to the static magnetic field.

$$f = J \times B_0 \qquad \text{Equation 4}$$

The eddy current is limited to the surface of the conductive material, as the current density decreases exponentially over the depth of the steel. The skin depth is defined as the distance from the surface of the material to the surface, where the density is decreased by 63% (factor of 1/e). The skin depth is calculated by the Equation 5:

$$\delta = \frac{1}{\sqrt{\pi f \mu \sigma}} \qquad \text{Equation 5}$$

Where $\delta$ denotes the skin depth in mm, f the frequency in Hz, $\mu$, the magnetic permeability in H/mm, and $\sigma$ refers to the electrical conductivity (% IACS). The skin depth is important when calculating the force distribution imposed by the EMAT.

Torsional Guided wave Propagation in Pipes

The physics of guided wave propagation in pipes is well understood [see Rose 2004]. There is an infinite number of different modes that can propagate and their phase velocities and mode shapes (characteristic displacements across pipe cross section) are frequency dependent. The wave propagation properties are usually summarised in form of dispersion curves as shown in FIG. 2.

The fundamental torsional wave mode T(0,1) is one of the best modes for guided wave inspection and monitoring. It is non-dispersive, which means that signals at all frequencies propagate along the pipe with the same velocity, namely the shear velocity (~3260 m/s for steel). Furthermore, the T(0,1) mode shape is a constant shear displacement across the pipe cross section. This results in equal sensitivity to defects that are located at different positions through the cross section.

Figure 2:
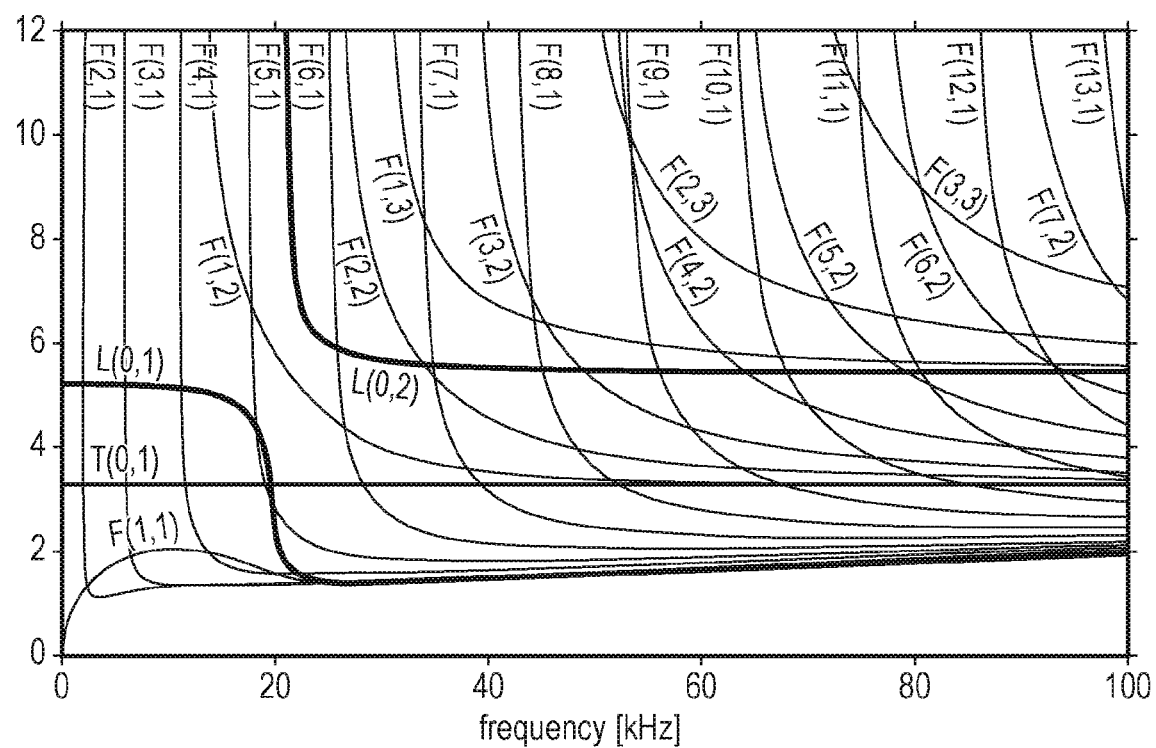
Figure 3:
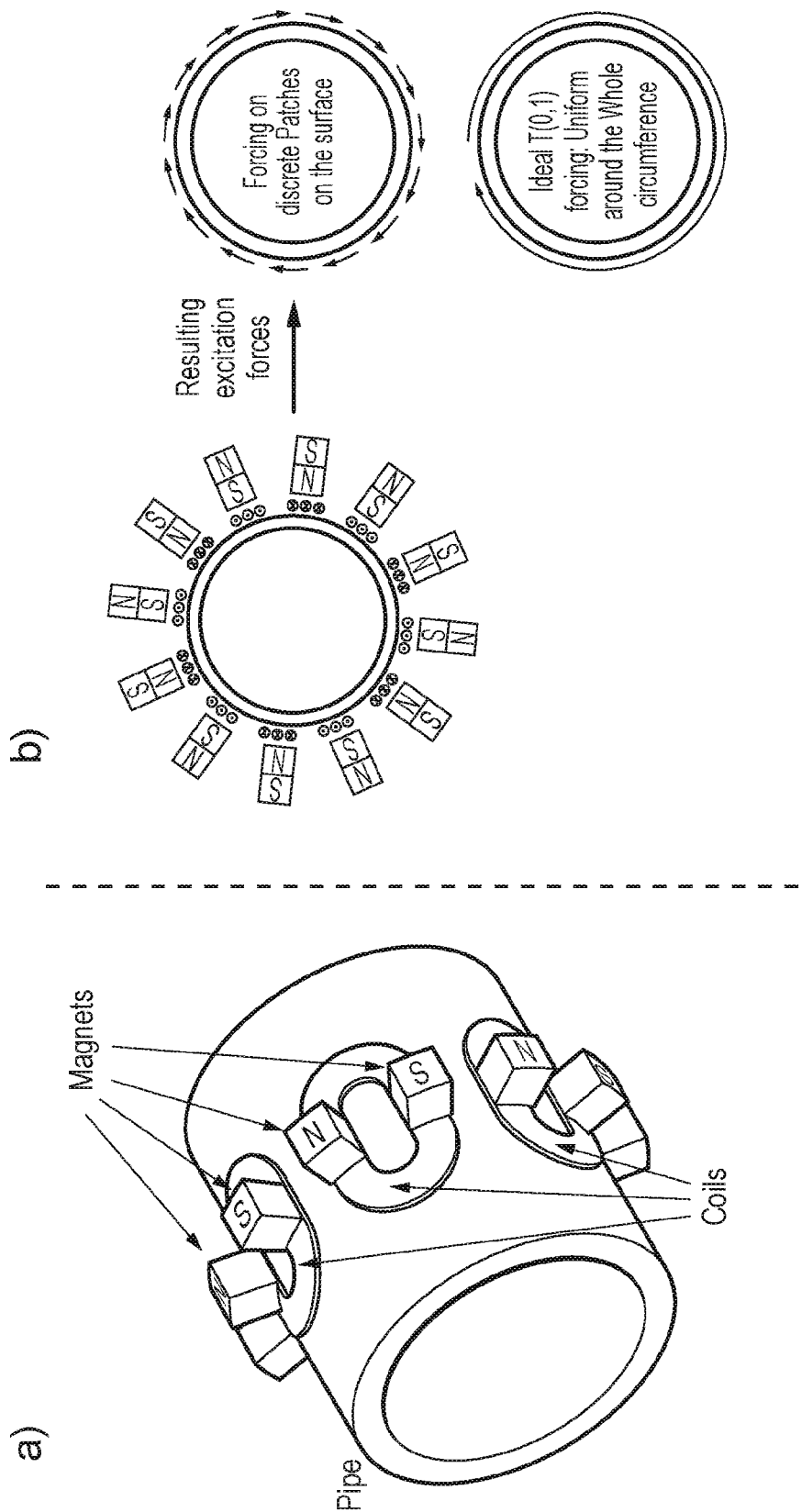

FIG. 2 also shows that many other modes can propagate along the pipe. These modes are either part of the longitudinal L(x,y) family or the flexural wave F(x,y) families, where x stands for the circumferential order and y for the mode number. Because, it is practically difficult or even impossible to purely excite the T(0,1) mode with a Lorentz force EMAT, it is helpful to suppress the higher order flexural modes during excitation. A Lorentz force EMAT for torsional wave excitation may be constructed as shown in FIG. 3. This type of arrangement results in a Lorentz force that is excited on the surface of the pipe in the tangential direction over 2N times discreet patches, where N is the number of coils that are distributed around the circumference of the pipe (see FIG. 3). In order to excite a clean torsional wave it is helpful that more equally distributed transducers (surface tractions) are provided than the order of the highest flexural mode that can exists within the operational bandwidth [see Alleyne 1999]. For a 3" pipe and the dispersion curve in FIG. 2 this is order 9 and therefore more than 9 patches are required, a suitable embodiment to meet this characteristic would be 6 coils and therefore 12 patches as shown in FIG. 3. More generally at least one linear array of said transmitter electromagnetic acoustic transducers comprises N transmitter electromagnetic acoustic transducers, where N is at least one of:
- a positive integer larger than a circumferential order of a first mode of flexural waves than can only exist within said pipe at frequencies above any substantially non-zero frequency components of said driving electrical signals and said received electrical signals; and
- an integer between 0.5 to 6 times P/$\lambda$, where P is a circumference distance around said pipe and $\lambda$ is a wavelength of shear waves in said pipe at frequencies corresponding to substantial frequency components of said driving electrical signals and said received electrical signals.

Directional Guided Wave Sending with Two Axially Separated Transmitters

When the torsional wave is excited at a given section of the pipe the torsional wave travels in both directions. Both right and left travelling waves are propagating with the same amplitude. As the fundamental torsional wave (T(0,1)) is non-dispersive (its phase velocity is constant at every frequency) the wave can be described with d'Alembert's Solution.

$$f(x,t) = y(x-ct) + y(x+ct) \qquad \text{Equation 6}$$

During testing the echoes from a slowly growing defect of corrosion may be detected. When the ultrasonic wave travels in both directions, the location of the received echoes cannot be determined, only the distance from the sender location can be calculated. Therefore it is beneficial to excite ultrasound waves which travel only in one direction and diagnose the echoes exact location.

Directional guided wave sending can be achieved using two rings of EMATs (linear arrays of transmitter EMATs) separated by a specified distance. Both rings of transmitter transducers generate the left and right travelling wave, but these waves will cancel out (destructively interfere) in one direction, while they will add up (constructively interfere) in the other direction.

Figure 4:
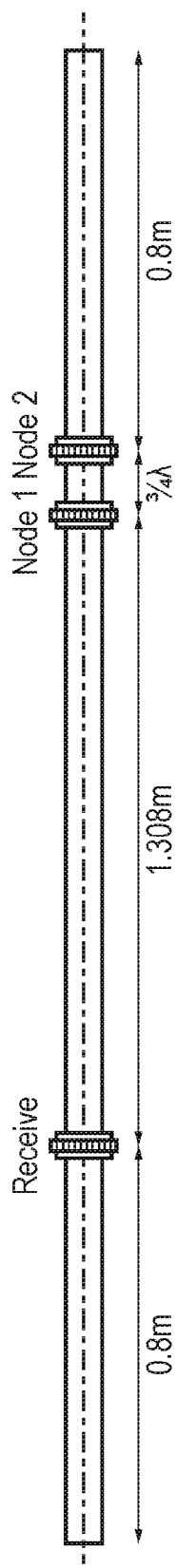

Consider two rings of transducers placed at a certain distance (p), as shown in FIG. 4. The position of the first transducer (Node1) is chosen to be at x=0, while the second transducer is then at position p.

The excitation signal used for testing is a windowed toneburst signal. The signal f(t) is the product of the window function w(t) and the carrier sinewave sin(t). The window function allows sending of finite-length signals for inspection. The window function is usually 3-10 times of the carrier sinewave period.

$$f(t) = w(t) \cdot \sin(t) \qquad \text{Equation 7}$$

The transducer at Node2 will be excited p/c later than the first transducer with negative polarity. The excited signals at the two locations will then be:

Node 1
$$F(ct-x) + F(ct+x) \quad t > 0 \qquad \text{Equation 8}$$

Node 2
$$-F\left(c \cdot \left(t - \frac{p}{c}\right) - (x-p)\right) - F\left(c \cdot \left(t - \frac{p}{c}\right) + (x-p)\right) \quad t > \frac{p}{c} \qquad \text{Equation 9}$$

The right travelling wave is given by:

$$F(ct-x) \quad \frac{p}{c} > t > 0 \qquad \text{Equation 10}$$

$$F(ct-x) - F\left(c \cdot \left(t - \frac{p}{c}\right) - (x-p)\right) = 0 \quad t > \frac{p}{c}$$

The right travelling wave will cancel out after time p/c. The same calculation with the left travelling wave:

$$F(ct+x) - -F\left(c \cdot \left(t - \frac{p}{c}\right) + (x-p)\right) = \qquad \text{Equation 11}$$
$$w(ct+x) \cdot \sin(ct+x) - w(ct+x-2p) \cdot \sin(ct+x-2p)$$

Consider p being the multiple of quarter wavelength and odd number as given by:

$$\frac{p}{c} = \frac{2n+1}{4}\frac{\lambda}{c} = \frac{2n+1}{4}T \qquad \text{Equation 12}$$

Using the information from Equation 12 and the fact that $\sin(x)=-\sin(x+\pi)$, the left travelling wave can be rewritten as:

$$[w(ct+x)+w(ct+x-2p)]\cdot\sin(ct+x) \qquad \text{Equation 13}$$

From this form it can be seen, that the two window functions with a time difference of 2p/c will be added together. So when the two rings of transmitter transducers are close, the window functions will overlap and the signal amplitude of the left travelling wave will add up.

Figure 5:
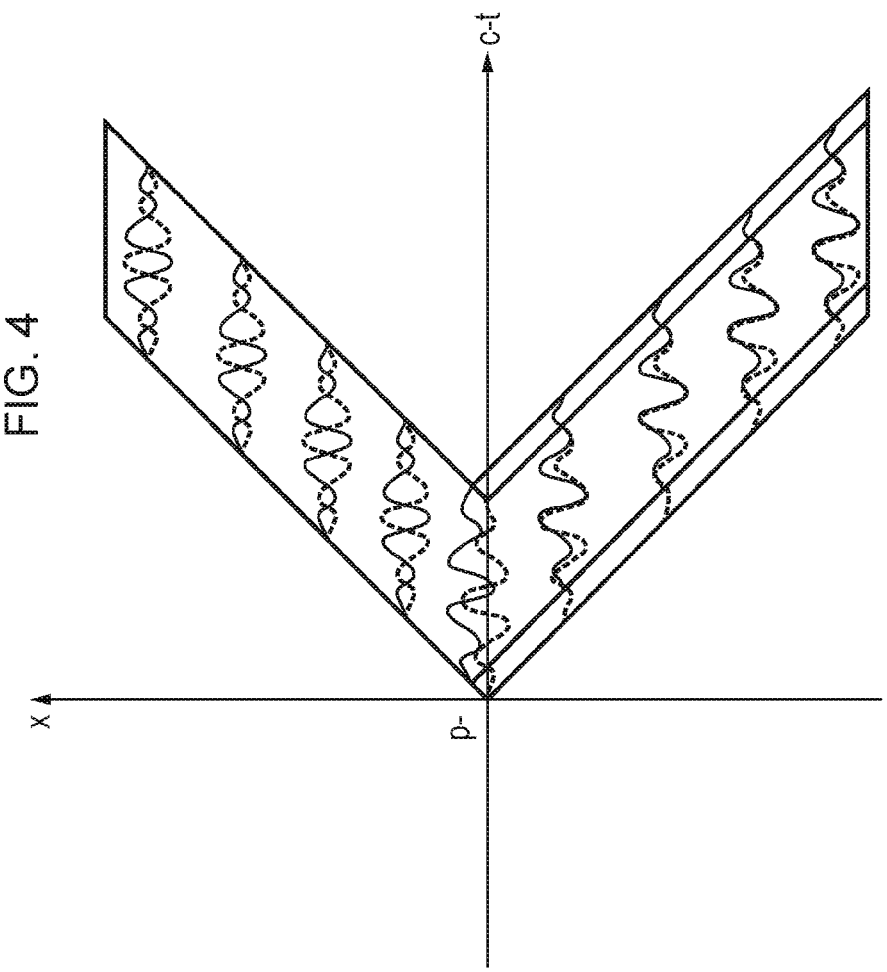

The travelling waves can be represented in a 2D diagram. The waves excited in the first and second location is plotted in FIG. 5.

Exciting the two rings of transmitter transducer does not necessarily have to be done in one measurement. The signals can be collected, and added together during post-processing. Furthermore, the time delay, and the negative polarity on one of the sensor can also be implemented after the measurement by suitable post processing.

In other embodiments the raw signals could be captured with a receiver transducer (linear array of receiver EMATs) at any location. When the left travelling wave is calculated the signal acquired from Node 2 is delayed and subtracted from the signal acquired from Node 1.

When the right travelling wave is calculated the signal from Node 1 is delayed and subtracted from the signal acquired from Node 2.

Figure 6:
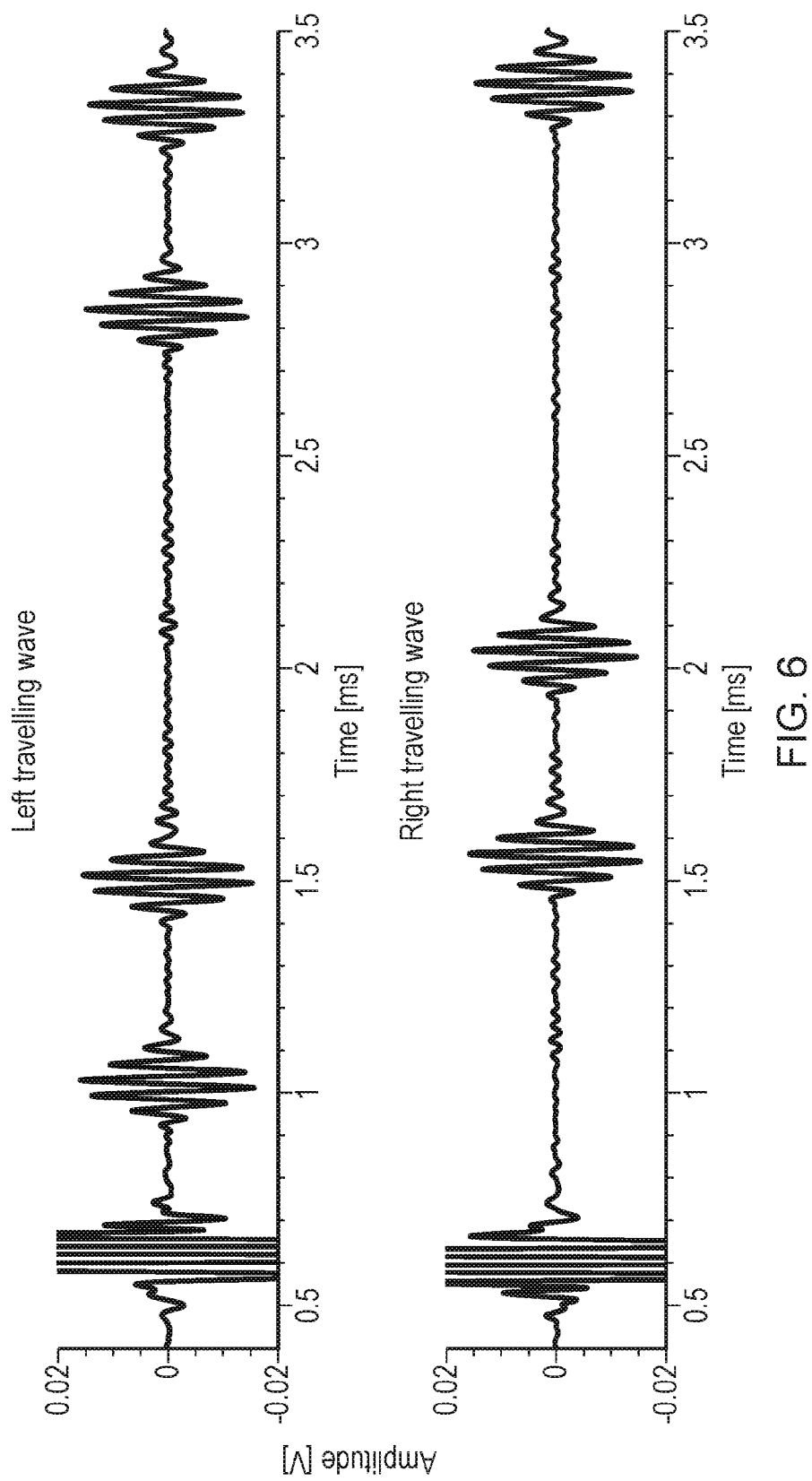

An example of the calculated left and right travelling wave is shown in FIG. 6.

The left and right travelling wave can be distinguished with a relatively good precision. Note, that the original 5 cycle toneburst signal have become 6.5 cycles long as expected.

Hence, at least two linear arrays of transmitter electromagnetic acoustic transducers are provided separated by a longitudinal separation distance in a direction substantially perpendicular to the linear array of receiver electromagnetic acoustic transducer. The driving electrical signals and the longitudinal separation distance act together to control a transmission direction of vibrations in said test object generated by said at least one linear array of transmitter electromagnetic acoustic transducers. That is, the ultrasound waves constructively interfere in the desired transmission direction and destructively interfere in the other direction, by setting the array distance and excitation delays correctly. The destructive interference in one of the directions (e.g. left direction) can be achieved when one of the transducer arrays (left one in this case) is excited p/c later. The constructive interference is then achieved when the distance between the two transducer arrays are set according to Equation 12 above.

Estimation of the Signal Amplitude after Transmission and Reception Loss

Analysing the received signal strength at a given input signal for one example embodiment can be useful. It gives an estimate of the required gain that the receiver amplifier needs to deliver. The transfer function from the transmitted signal (provided by driving electrical signals in the transmitter coils) to the received signal (received as received electrical signals in the receiver coils) is divided into 3 parts:
force generation at the sender location,
generated displacement, and
received voltage at the coil terminals.

1. Generated Force at the Sender Location
With the input voltage of 10 V generated at the instruments the coil current can be calculated. The instrument output resistance is 50 Ohms.
The EMAT impedance is 48.02+39.01j Ω.

$$I_c = \left|\frac{10}{50+48.02+39.01j}\right| = 0.0948[A] \qquad \text{Equation 14}$$

The maximum eddy current depends on the coil current, number of the turns in the coils and the coupling factor. This in our coil is:

$$I_e \approx kN_c I_c \approx 0.9\cdot 34\cdot 0.0948 = 2.9005\ [A] \qquad \text{Equation 15}$$

The Lorentz force can now be calculated as the volume integral of the eddy current $$F_t \iiint B_z \cdot K_e dV \qquad \text{Equation 16}$$

After making the calculations the surface force traction is $$\frac{F_t}{A} = 81.63\left[\frac{N}{m^2}\right] \qquad \text{Equation 17}$$

2. Displacement at a particular force
The surface displacement per given force may be calculated with finite element simulations.
The simulated displacement amplitude is 0.03837 nm.
3. Received voltage at the coil terminals
The torsional wave with the amplitude of 0.03837 nm can be detected with the receiver coils. The steel particles move near the static magnetic field, electric field "E" is induced; this equals the cross product of the velocity of the moving particles "v", and the static magnetic field B, as shown in Equation 18. The generated current flow can be picked up with the receiver coils.

$$E = v \times B \qquad \text{Equation 18}$$

$$J \propto E \qquad \text{Equation 19}$$

Figure 7:
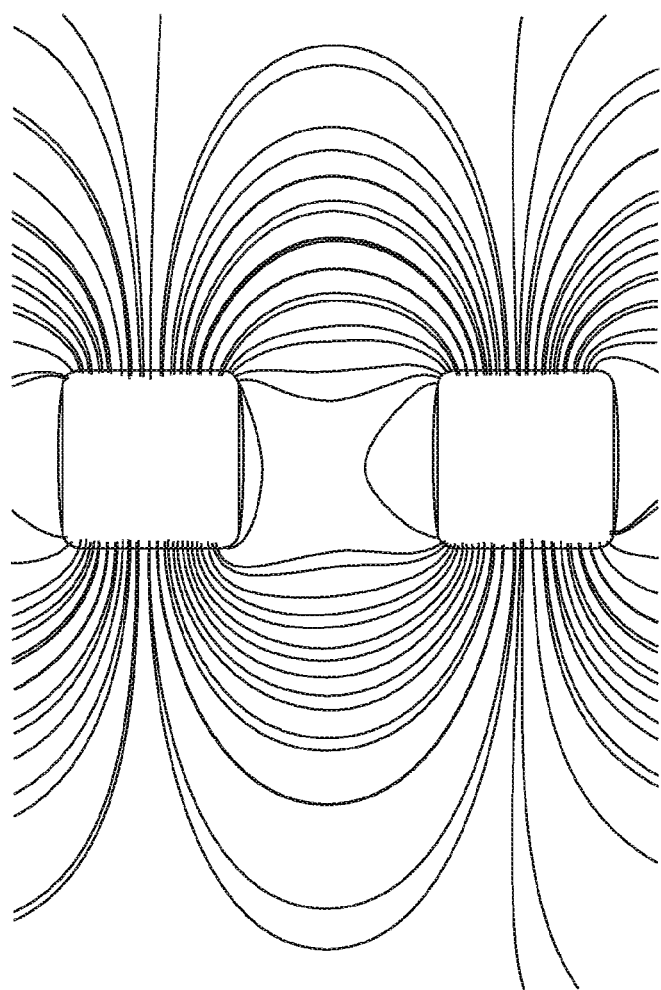

The shape of the current flow caused by the electric field may be determined by a finite element simulation. The streamlines of the resulted current flow is shown in FIG. 7. The shape of the flow is similar to the coil's shape; therefore a high coupling factor is expected between the induced current and the pick-up coil. The current flow and the pick-up coil can again be modelled as a transformer circuit. This time the receiver coil is the secondary loop with the number of turns NC. The twelve coils are connected in series, so their output voltages are added up. The input voltage of the amplifier is calculated according Equation 20.

The voltage received at the coil terminals is estimated to be $$|V_{amp}| = 1.349\ \mu V \qquad \text{Equation 20}$$

After 89 dB (factor of 28183) receive amplifier gain the received voltage is expected to be:

$$V = 0.03802\ [V] \qquad \text{Equation 21}$$

This voltage can be sampled by a standard A/D convert that has quantisation levels of ~1 mV, random noise can be suppressed by averaging if necessary.

Capacitive and Electro-Magnetic Breakthrough Mechanisms that Result in High Gain Amplifier Saturation The previous section has shown that the signals that are received are small and large amplification (~90 dB gain) may be required to make them measurable with standard digital acquisition (DAC) equipment. This poses the problem that direct coupling mechanisms between the transmitter and receiver transducer can result in signals that are much larger than the guided wave signal that is received from the wave traveling the pipe wall. The signals can be so large that they saturate the receive amplifier resulting in a constant maximum amplifier voltage output signal. Any dynamic information from the ultrasonic signals is then lost. If the signal drops below the level at which the amplifier saturates, it usually takes a long time before the amplifier will recover and function again. Two direct coupling mechanism that result in large breakthrough signals are capacitive coupling and electro-magnetic coupling.

Figure 8:
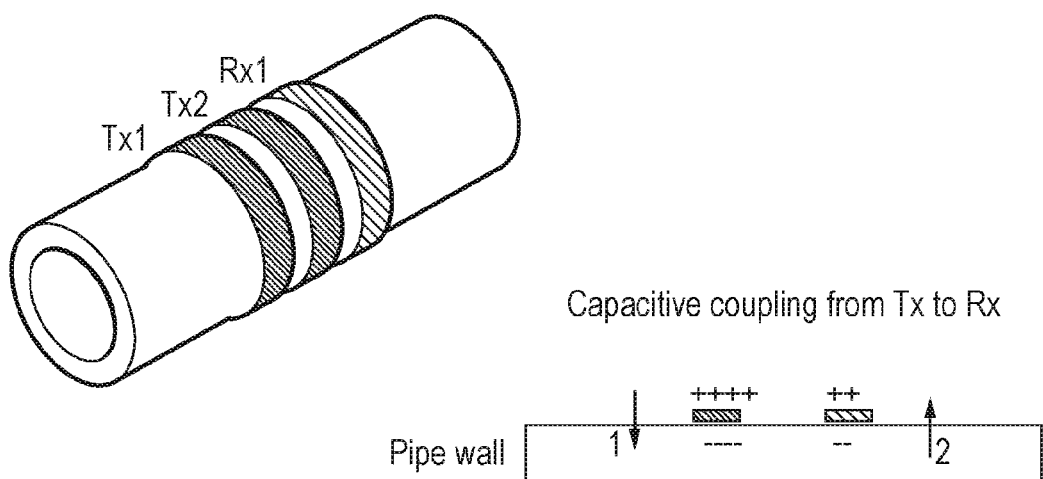

Capacitive coupling is a result of charge accumulation of the sending transducer coils (transmitter coils) with respect to the closely located, conducting pipe surface. This in turn results in a relative charge imbalance between the pipe and the closely located receiver coil(s). Therefore, a net sending voltage on the transmitting transducer will be passed to the receiver. Under normal conditions for typical coils that may be used, the capacitive breakthrough results in signal amplitudes (before amplification) of the order of −40 dB. This cannot be amplified with a 89 dB amplifier. The phenomenon is illustrated in FIG. 8.

Figure 9:
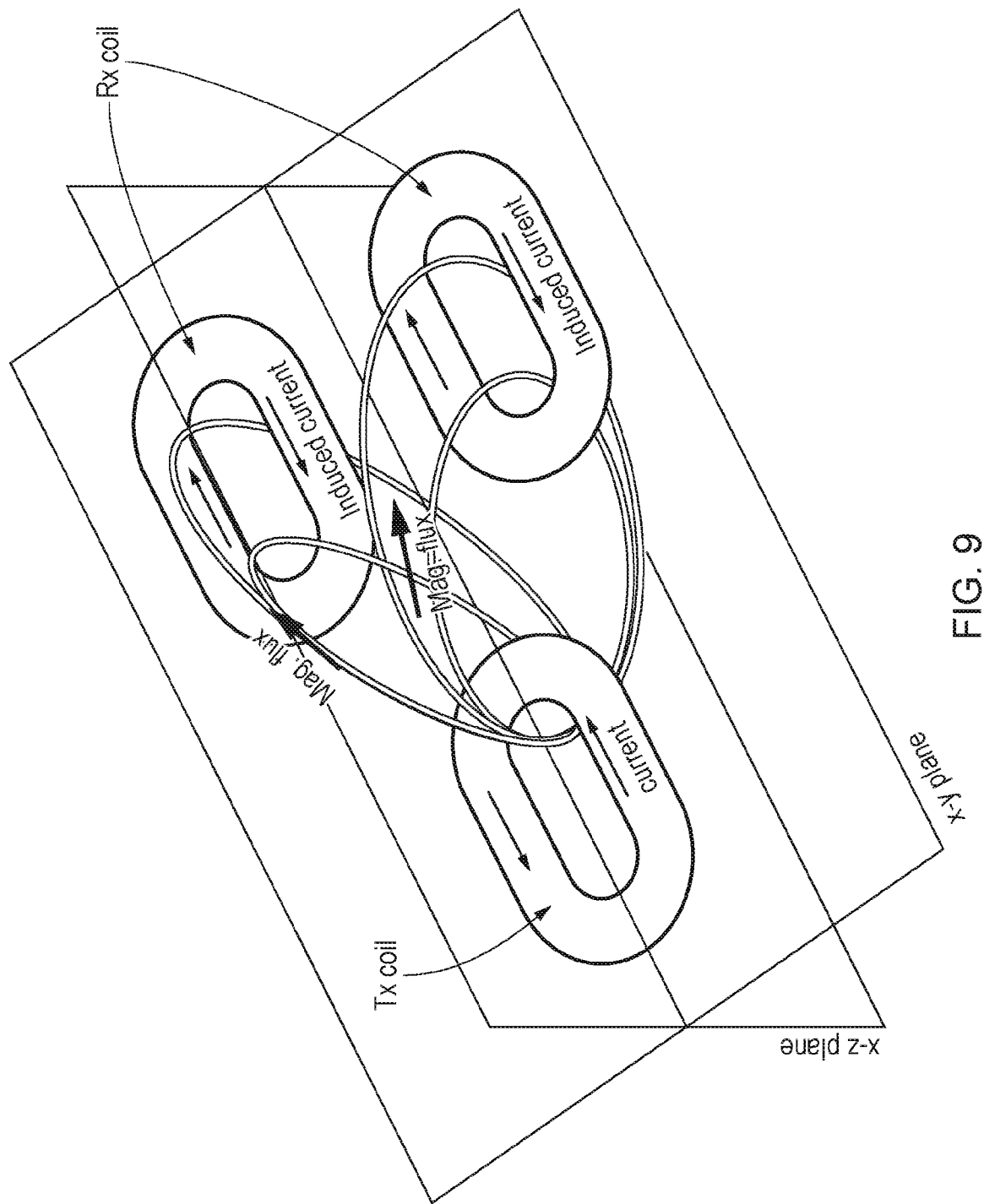

Electro-magnetic coupling is a result of magnetic flux generated by the transmitter coils passing through the receiver coils and inducing an electro-motive force (EMF) in them. The induced EMF is a function of the flux density that leaves the transmitter coil and passes through the receiver coil. It is therefore a function of the separation distance between the transmitter and receiver. Measurements have shown that a typical coil arrangement would require a separation distance in excess of 1 m to result in breakthrough signals that do not result in amplifier saturation. FIG. 9 illustrates the principle of electromagnetic coupling between a transmitter coil and 2 receiver coils. The illustration shows planar coils on a flat x-y plane for simplicities sake. The principle is equally applicable to coils that are located on the outer surfaces of an axi-symmetric structure such as a pipe.

Figure 10:
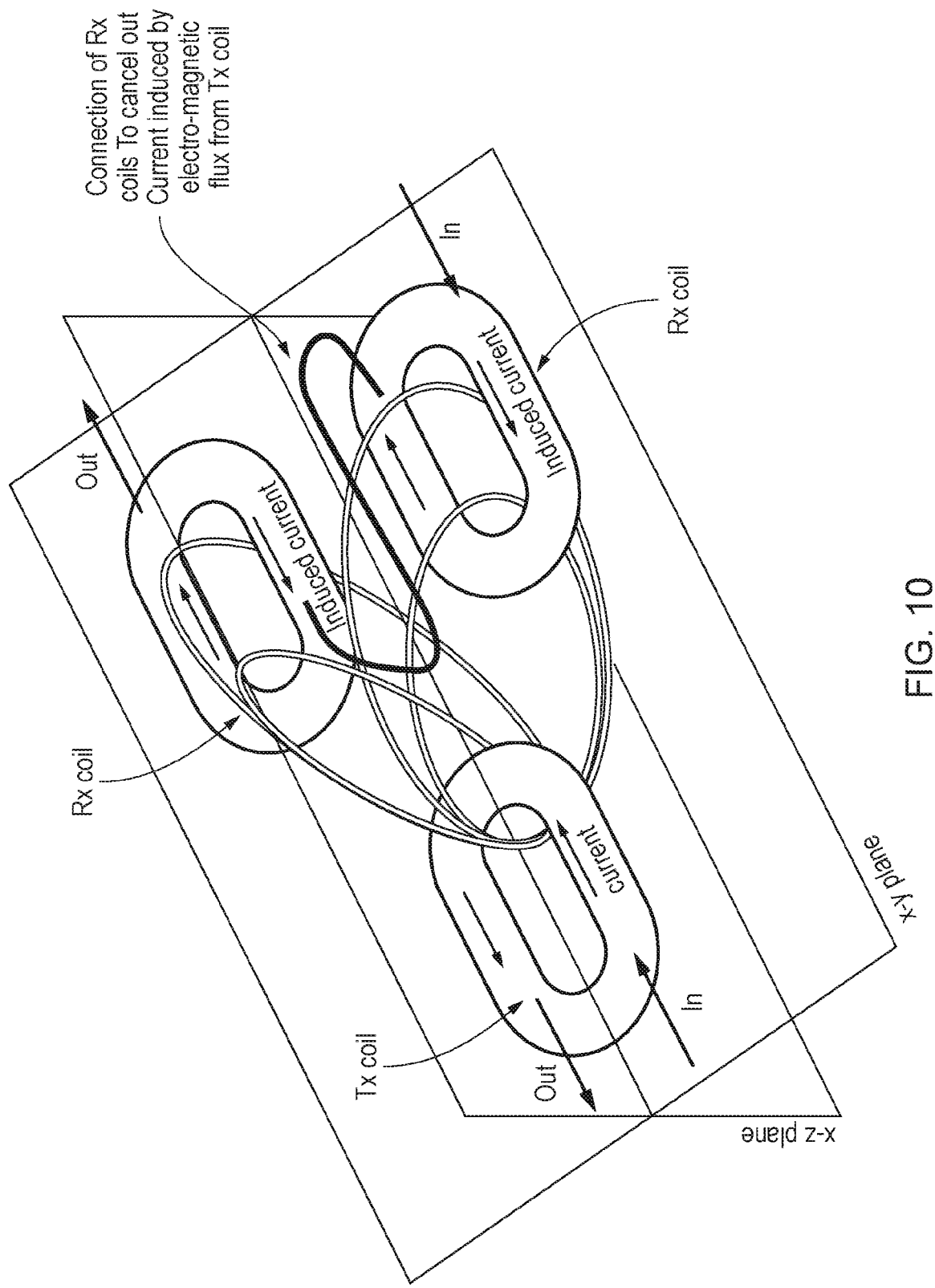

Torsional Guided Wave EMAT Transducer Design that Reduces Breakthrough Problems and Enables Transmission and Reception of Guided Wave Signals from Pipes with Closely Located Transducers To address the capacitive and electromagnetic coupling mechanisms, and to make sending and receiving of guided wave EMAT signals with closely located transmitters and receivers more practical, an arrangement of transmitter and receiver coils as described below can be used:

1. In order to reduce (cancel out) capacitive coupling the transmitter coils can be driven by driver circuitry in a differential mode. (The receiving circuitry may also operate differentially). This means that there is no net charge difference between the transmitter coil, pipe and receiver coils so that no capacitive coupling takes place. (it can be beneficial to place the coil side that sees the higher voltage further away from the pipe surface and alternating polarity between consecutive coils around the circumference can also be beneficial).
2. To reduce (cancel out) electro-magnetic coupling the receiver EMAT ring may have receiver coils that are placed symmetrically with respect to the radial axial plane that passes through the transmitter coil so that the transmitter coil is also symmetric with respect to that plane. In practice, this symmetrical arrangement may not be necessary, but it is helpful in understanding the principle of the effect. Furthermore, the two receiver coils that are symmetrically located with respect to the transmitter coil may be connected in such a way that the currents induced in them by a current in the transmitter coil, cancel out. (e.g. connected back to front or in opposite polarity, see FIG. 10). Moreover, this then requires also for the polarity of the magnets that are placed on the coils to be changed so that an incoming signal due to a torsional wave can be received. The receiver coils are connected in series such that the sum of the electromotive forces induced by the transmitter coils over all the receiver coils is substantially zero (or at least significantly reduced).

Figure 11:
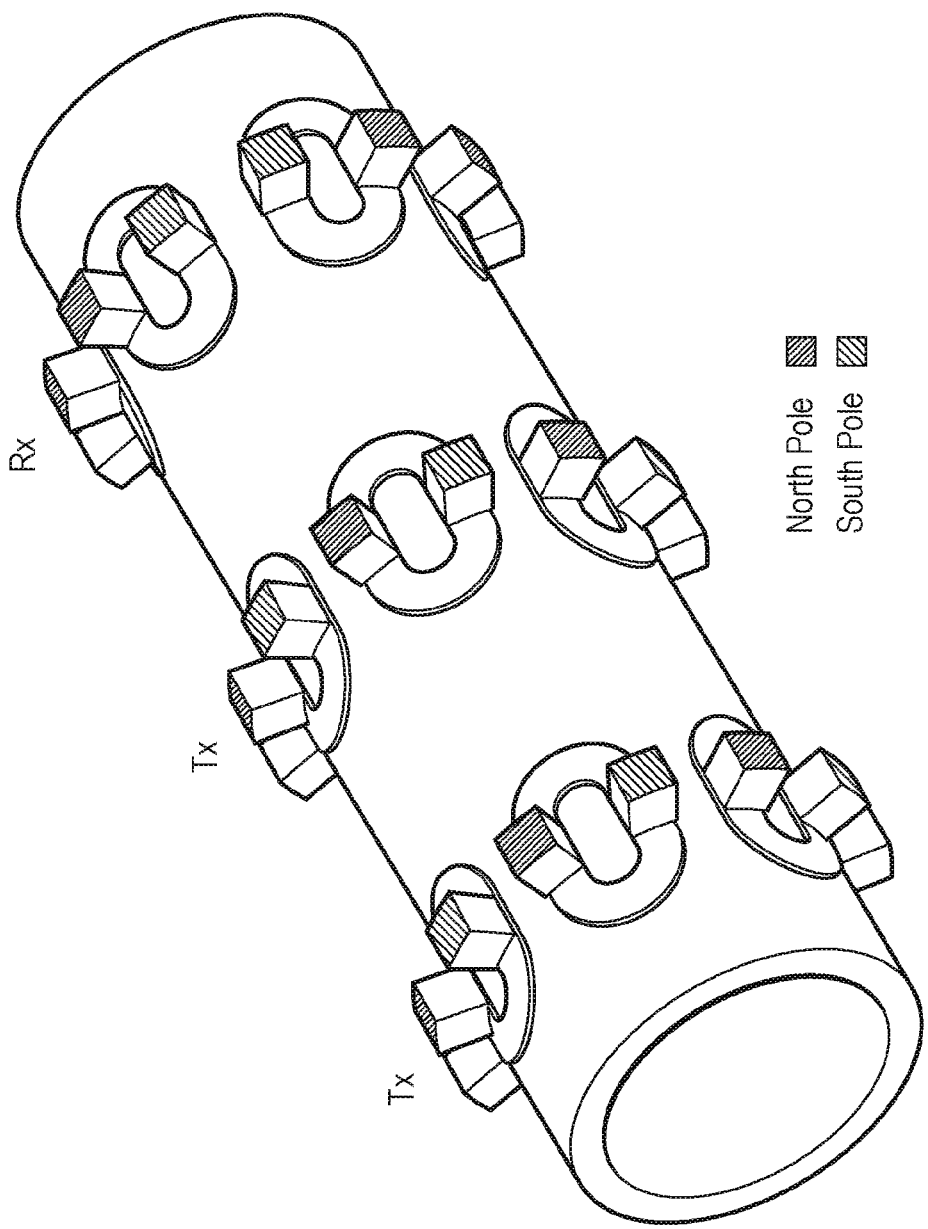

An embodiment that shows an EMAT transducer for torsional guided wave transmission and reception is shown in FIG. 11. It shows two transmitter rows (linear arrays) for directional signal transmission and one receiving transducer (linear array) (the transducer arrays are spaced apart longitudinally along the pipe axis) that is constructed so that the breakthrough signal is reduced and sensitivity to the guided wave signal is increased. The transmitter coils have a common size, shape and number of turns as well as a common winding direction. They have a race track shape with two substantially straight portions aligned with the longitudinal direction of the pipe. The receiver coils also have a common size, shape (race track) and number of turns, but alternate in their winding direction. The coils may be formed as flexible printed circuits (e.g. multilayer Kapton PCBs). In the example shown all of the receiver coils are connected in series. In some embodiments desired reduction in electromagnetic coupling from the transmitter coils to the receiver coil may be achieved when two or more of the receiver coils are connected in series.

Figure 12:
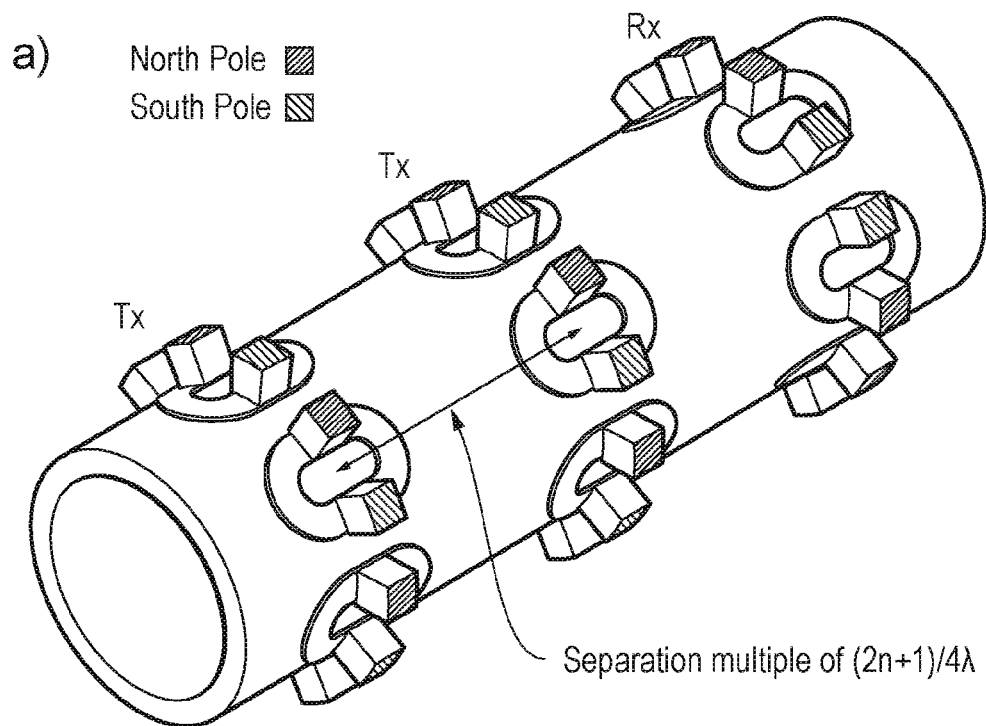
Figure 12:
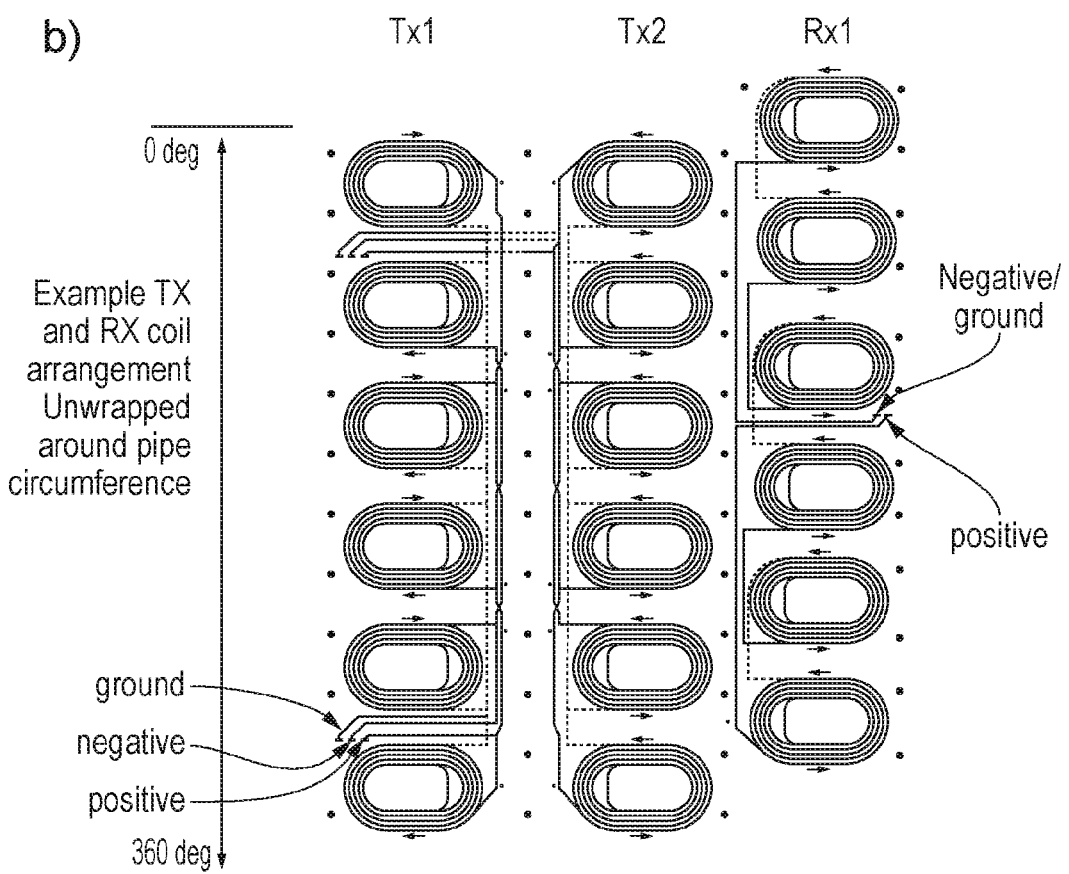
Figure 12:
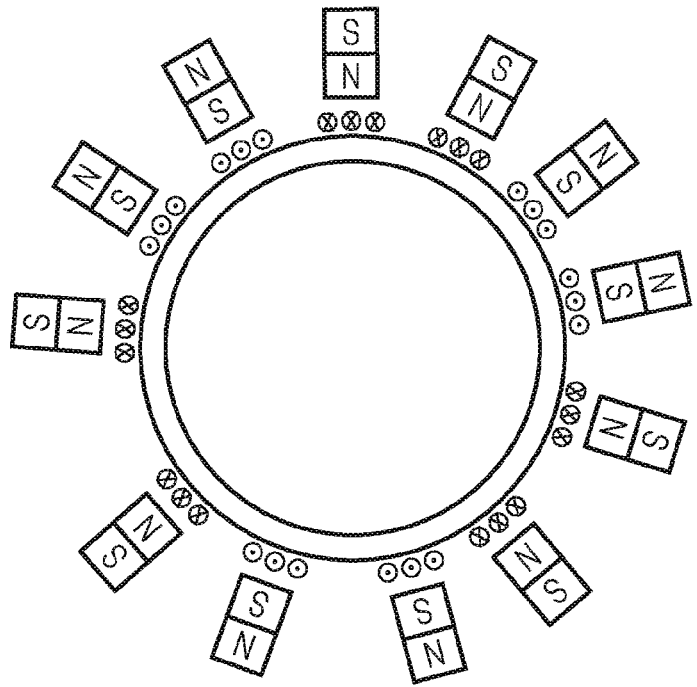
Figure 12:
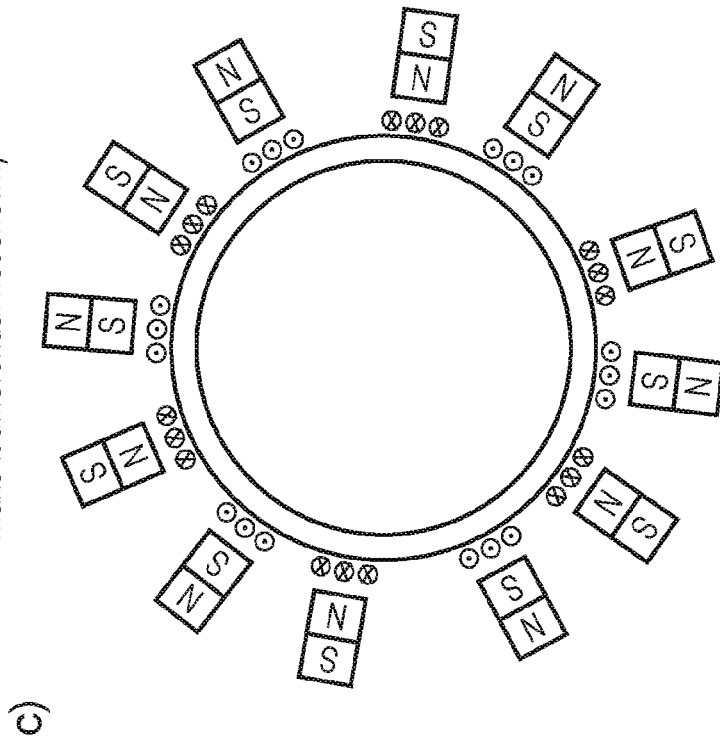

FIG. 12 shows features that allow electromagnetic breakthrough suppression for closely spaced EMAT rings:

1. The Tx coils are differentially driven so that no (or little) capacitive coupling between Tx and Rx coils takes place. The magnets alternate in direction (polarity) between adjacent coils).
2. The Tx and Rx rings are at different circumferential positions so that symmetry and a change in wiring (winding direction) cancels out (or reduces) the electromagnetic breakthrough signal. Furthermore, the magnet orientation pattern around the circumference of the receiver coils has to be changed so that a torsional wave can still be received. The magnets of adjacent coils share a direction (polarity).

The transmitter coils may all share a winding direction and the receiver coils have alternating winding directions as shown in FIG. 12. The principles of magnetic reciprocity mean that in other embodiments the transmitter coils may have alternating winding direction and the receiver coils have a shared winding direction. In this case the orientations of the magnetic fields through the coils will be correspondingly changed to take account of the changes in the current flow direction through the underlying section of coil so as to still either drive or receive the desired mode of guided wave vibration, i.e. currents and magnetic fields oriented so as to all drive or receive the same torsional displacement direction in the pipe. For example, transmitter coils with alternating winding directions will themselves have oppositely oriented magnets and neighbouring magnets for neighbour transmitter coils will have the same magnet orientation; and receiver coils with a common winding direction will themselves have oppositely oriented magnets and neighbouring magnets for neighbour receiver coils will have opposite magnet orientations.

Example Signals and Results from Prototype Transducer

Figure 13:
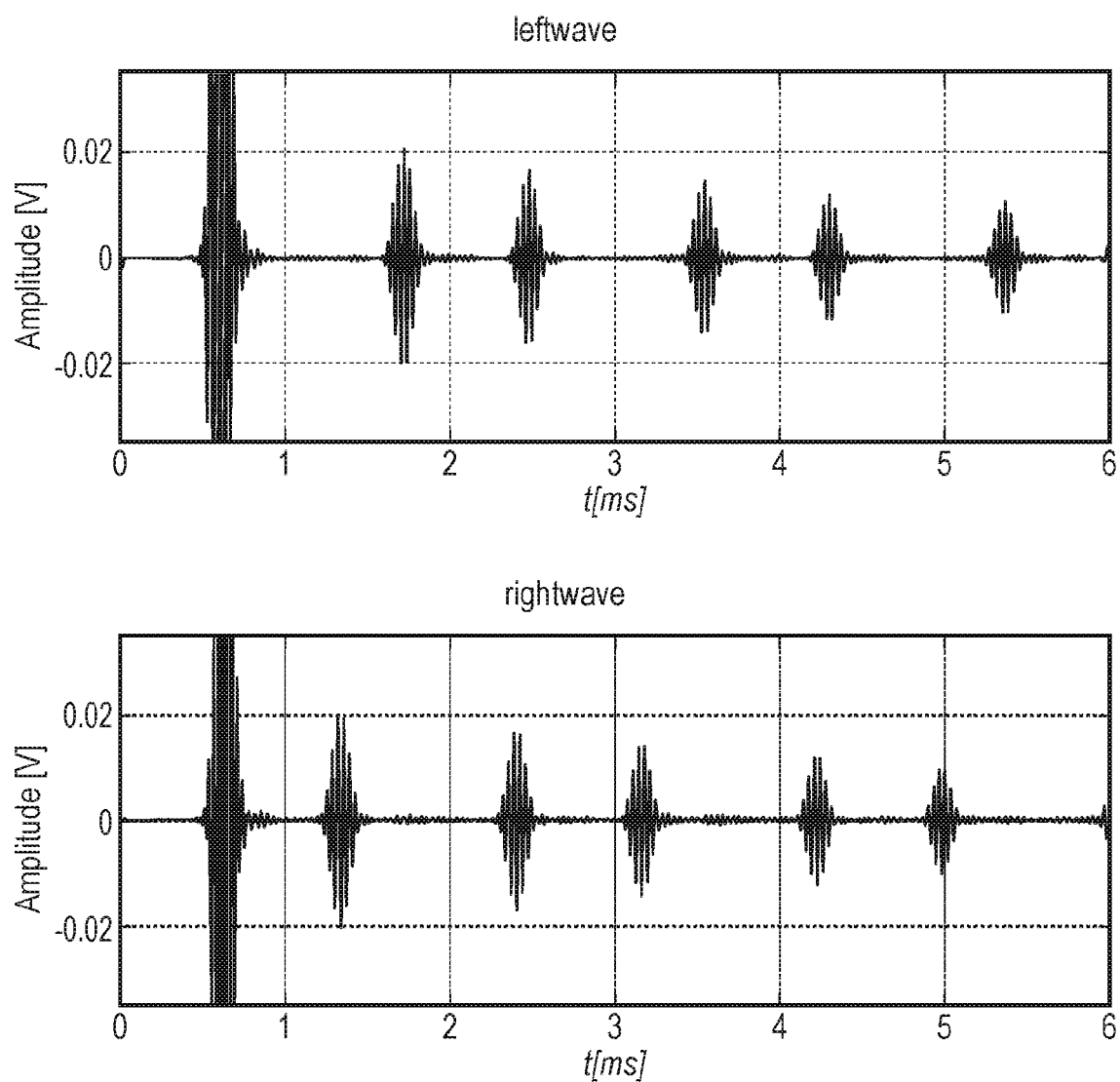

As previously mentioned, the right and left travelling waves can be distinguished. FIG. 13 shows the post-processed left and right travelling waves. The signals are relatively pure; between two torsional wave echoes almost no other waves are present. The signals are recorded from a transducer prototype, placed on the middle section of a 3 meter pipe (see FIG. 14). The first echo (between 1 and 2 ms) is the wave reflected by the pipe end. The other echoes (from 2-6 ms) are reflected several times at both ends of the 3 meter pipe.

This acquired signal was averaged 500 times to reduce the electrical noise from the signal. With averaging, the noise level is decreases. This increases the Signal-to-Noise ratio of the measurement. With good signal to noise ratio, stable measurement system can be operated, where the defect detection probability is high.

Figure 14:
FIG. 14 is a picture illustrating a working prototype.

FIG. 14 shows the transducers (both transmitter and receiver and including the magnets) provided within a flexible sheet (which holds them in their relative positions), which may be wrapped around a pipe to be tested. The flexible sheet includes ribs oriented to permit flexing of said sheet parallel to a longitudinal of said pipe direction (i.e. perpendicular to a direction of surface curvature of the pipe) when said linear array of receiver electromagnetic acoustic transducers is circumferentially arranged around said pipe and to resist flexing of said sheet perpendicular to said longitudinal direction. The transducer may also be covered with electromagnetic shielding to protect the receiver coils from electro-magnetic fields external from the pipe. The transducers, flexible sheet, ribs and other components may be formed of materials resistant to high temperature (e.g. Kapton, metal tracks, silicone, etc.) so as to provide an operating temperature range including temperatures great than one of 100° C., 150° C., or 200° C.

Figure 15:
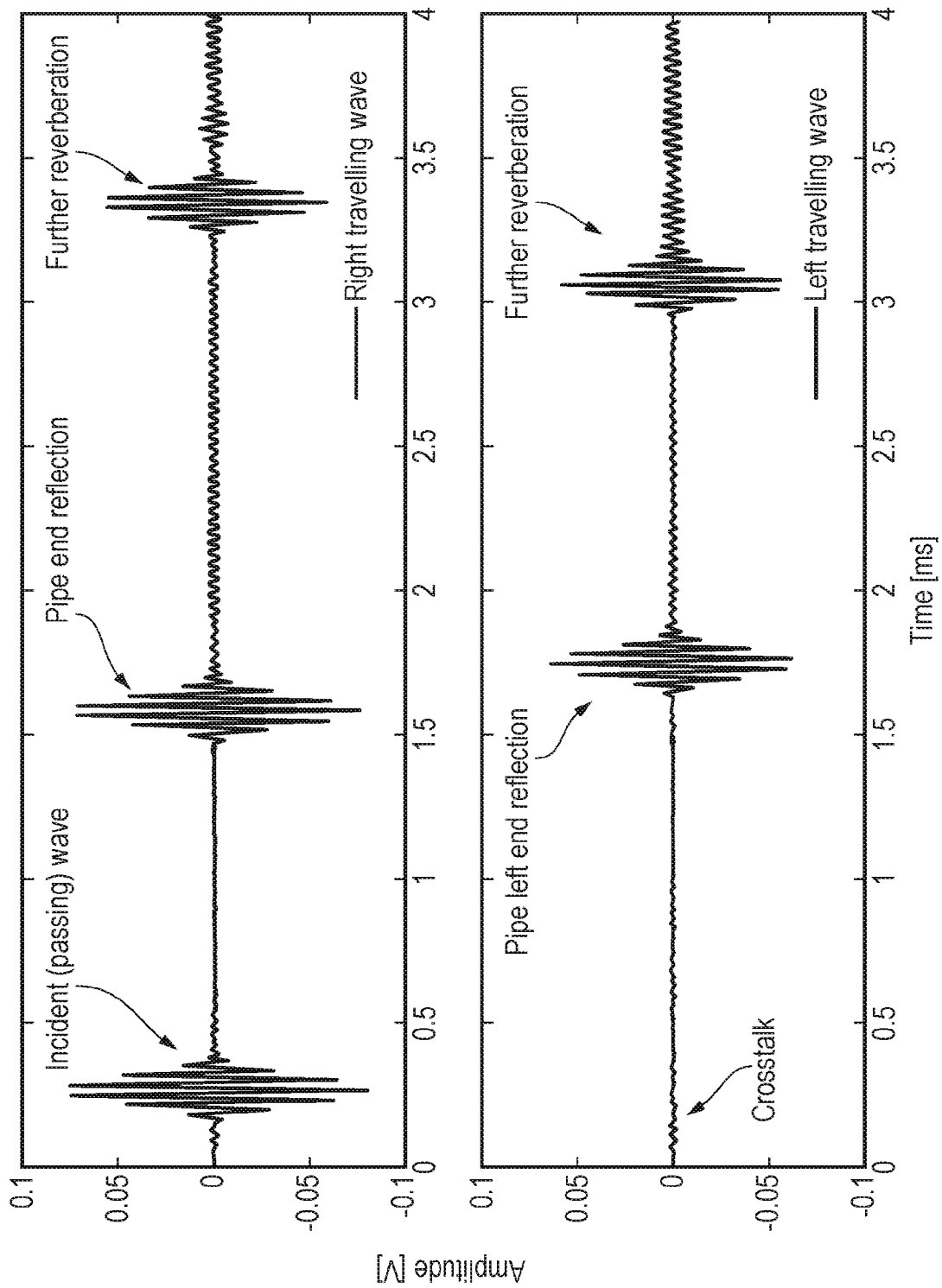
FIG. 15 illustrates an example of acquired left and right travelling waves.

FIG. 15 shows an example of acquired ultrasonic signals with the proposed measurement system. In this example, the separation of the receiver and transmitter arrays was 40 cm. Perfect cancellation (destructive interference) was achieved for both the right or left travelling waves. The crosstalk is reduced in level.

REFERENCES

JOSEPH L. ROSE (2004): Ultrasonic Waves in Solid Media. Cambridge University Press, Cambridge.
D. N. ALLEYNE, B. PAVLAKOVIC, M. J. S. LOWE, P. CAWLEY (1999): Rapid Long range Inspection of Chemical Plant Pipework Using Guided Waves, Web Url: http://www.ndt.net/article/wcndt00/papers/idn.166/idn166.htm
Johnson, W. L., Alers, G. A., & Auld, B. A. (1999). U.S. Pat. No. 5,895,856.
Kwun, H., Kim, S.-Y., & E., C. A. (2003). U.S. Pat. No. 6,624,628.
Vasile, C. F. (1977). U.S. Pat. No. 4,127,035.
Wang, Y., Wu, X., Sun, P., & Li, J. (2015). Enhancement of the Excitation Efficiency of a Torsional Wave PPM EMAT Array for Pipe Inspection by Optimizing the Element Number of the Array Based on 3-D FEM. Sensors, 3471-3490.

The invention claimed is:

1. Apparatus for guided wave testing a test object comprising:
a linear array of receiver electromagnetic acoustic transducers, each of said receiver electromagnetic acoustic transducers having a receiver coil and serving to convert vibrations in said test object into received electrical signals in said receiver coil; and
at least one linear array of transmitter electromagnetic acoustic transducers disposed substantially parallel to said linear array of receiver electromagnetic acoustic transducers and configured to launch guided waves in said test object in a direction substantially perpendicular to said at least one linear array of transmitter electromagnetic acoustic transducers, each of said transmitter electromagnetic acoustic transducers having a transmitter coil and serving to convert driving electrical signals in said transmitter coil into vibrations in said test object,
wherein
transmitter coils of electromagnetic acoustic transducers within said at least one linear array of transmitter electromagnetic acoustic transducers have a common winding direction, receiver coils of adjacent receiver electromagnetic acoustic transducers within said linear array of receiver electromagnetic acoustic transducers have alternating winding directions, and receiver coils of at least two adjacent electromagnetic acoustic transducers within said linear array of receiver electromagnetic acoustic transducers are connected in series.

2. Apparatus as claimed in claim 1, wherein said test object is a pipe, said linear array of receiver electromagnetic transducers and said at least one linear array of transmitter electromagnetic acoustic transducers are configured to be circumferentially arranged around said pipe.

3. Apparatus as claimed in claim 1, wherein all receivers coils within said linear array of receiver electromagnetic acoustic transducers are connected in series.

4. Apparatus as claimed in claim 1, wherein a sum of electromotive force induced in said receiver coils of said linear array of receiver electromagnetic acoustic transducers connected in series by electromagnetic coupling with said transmitter coils of said at least one linear array of transmitter electromagnetic acoustic transducers is substantially zero.

5. Apparatus as claimed in claim 1, wherein at least one of:
said transmitter coils have a same number of coil turns and a substantially common shape and size; and
said receiver coils have a same number of coil turns and a substantially common shape and size.

6. Apparatus as claimed in claim 1, wherein
said receiver coil has a racetrack shape having two substantially straight sections aligned substantially perpendicular to said linear array of receiver electromagnetic acoustic transducers; and
a magnet pole disposed over each of said substantially straight portions and arranged to provide a magnetic field passing through a corresponding one of said two substantially straight portions substantially orthogonally to an outer surface of said test object when said linear array of receiver electromagnetic acoustic transducers is coupled to said test object.

7. Apparatus as claimed in claim 6, wherein
said magnet poles disposed over said two substantially straight portions of said receiver coil have opposite magnetic field orientations.

8. Apparatus as claimed in claim 7, wherein
adjacent magnet poles of adjacent receiver coils have a common magnetic field orientation.

9. Apparatus as claimed in claim 6, wherein
said transmitter coil has a racetrack shape having two substantially straight sections aligned substantially perpendicular to said linear array of receiver electromagnetic acoustic; and
a magnet pole disposed over each of said substantially straight portions and arranged to provide a magnetic field passing through a corresponding one of said two substantially straight portions substantially orthogonally to an outer surface of said test object when said linear array of receiver electromagnetic acoustic transducers is couple to said test object.

10. Apparatus as claimed in claim 9, wherein
said magnet poles disposed over said two substantially straight portions of said transmitter coil have opposite magnetic field orientations.

11. Apparatus as claimed in claim 10, wherein
adjacent magnet poles of adjacent transmitter coils have opposite magnetic field orientation.

12. Apparatus as claimed in claim 6, comprising at least one of:
a drive circuit to generate said driving electrical signals as differential signals;
a receiver circuit to receive said received electrical signals as differential signals; and
electromagnetic shielding to protect said receiver coils from electro-magnetic fields external from said pipe and said apparatus.

13. Apparatus as claimed in claim 6, wherein said at least one linear array of transmitter electromagnetic acoustic transducers comprises at least two linear arrays of transmitter electromagnetic acoustic transducers separated by a longitudinal separation distance in a direction substantially perpendicular to said linear array of receiver electromagnetic acoustic transducers.

14. Apparatus as claimed in claim 13, wherein said driving electrical signals and said longitudinal separation distance act together to control a transmission direction of vibrations in said test object generated by said at least one linear array of transmitter electromagnetic acoustic transducers.

15. Apparatus as claimed in claim 2, wherein all receivers coils within said linear array of receiver electromagnetic acoustic transducers are connected in series, and said vibrations correspond to a fundamental torsional wave mode vibration T(0,1) within said pipe.

16. Apparatus as claimed in claim 6, wherein propagating waves excited by said vibrations are non-dispersive.

17. Apparatus as claimed in claim 6, comprising a flexible sheet housing said linear array of receiver electromagnetic acoustic transducers and including a plurality of ribs oriented to permit flexing of said sheet parallel to a direction of surface curvature of said test object when said linear array of receiver electromagnetic acoustic transducers is coupled to said test object and to resist flexing of said sheet perpendicular to said direction of surface curvature.

18. Apparatus as claimed in claim 6, wherein said apparatus comprises components having an operating temperature including temperatures greater than 100° C.

19. A method of guided wave testing a test object comprising:
coupling a linear array of receiver electromagnetic acoustic transducers to said test object, each of said receiver electromagnetic acoustic transducers having a receiver coil;
coupling at least one linear array of transmitter electromagnetic acoustic transducers to said test object, each of said transmitter electromagnetic acoustic transducers having a transmitter coil;
converting driving electrical signals in said transmitter coil into transmitted vibrations in said test object; and
converting received vibrations in said test object into received electrical signals in said receiver coil,
wherein
transmitter coils of electromagnetic acoustic transducers within said at least one linear array of transmitter electromagnetic acoustic transducers have a common winding direction, receiver coils of adjacent receiver electromagnetic acoustic transducers within said linear array of receiver electromagnetic acoustic transducers have alternating winding directions, and receiver coils of at least two adjacent electromagnetic acoustic transducers within said linear array of receiver electromagnetic acoustic transducers are connected in series.

20. Apparatus for guided wave testing a test object comprising:
a linear array of receiver electromagnetic acoustic transducers, each of said receiver electromagnetic acoustic transducers having a receiver coil and serving to convert vibrations in said test object into received electrical signals in said receiver coil; and
at least one linear array of transmitter electromagnetic acoustic transducers disposed substantially parallel to said linear array of receiver electromagnetic acoustic transducers and configured to launch guided waves in said test object in a direction substantially perpendicular to said at least one linear array of transmitter electromagnetic acoustic transducers, each of said transmitter electromagnetic acoustic transducers having a transmitter coil and serving to convert driving electrical signals in said transmitter coil into vibrations in said test object,
wherein transmitter coils of adjacent transmitter electromagnetic acoustic transducers within said at least one linear array of transmitter electromagnetic acoustic transducers have alternating winding directions, receiver coils of adjacent electromagnetic acoustic transducers within said linear array of receiver electromagnetic acoustic transducers have a common winding direction and receiver coils of at least two adjacent electromagnetic acoustic transducers within said linear array of receiver electromagnetic acoustic transducers are connected in series.

* * * * *